United States Patent [19]

Poco

[11] Patent Number: 5,242,647
[45] Date of Patent: Sep. 7, 1993

[54] METHOD OF CASTING AEROGELS

[75] Inventor: John F. Poco, Livermore, Calif.

[73] Assignee: Regents of The University of California, Oakland, Calif.

[21] Appl. No.: 738,023

[22] Filed: Jul. 30, 1991

Related U.S. Application Data

[63] Continuation-in-part of Ser. No. 571,061, Aug. 23, 1990, abandoned.

[51] Int. Cl.$^5$ .................. B29C 39/00; B29C 71/00; C01B 33/14; C03B 19/02
[52] U.S. Cl. .................. 264/225; 264/232; 264/313; 264/344; 65/901; 423/338
[58] Field of Search .............. 423/338, 336; 264/219, 264/313, 225, 340, 344, 232; 249/134, 127; 65/18.1, 18.4, 901

[56] References Cited

U.S. PATENT DOCUMENTS

| | | | |
|---|---|---|---|
| 3,320,344 | 5/1967 | Slipp | 264/219 |
| 3,520,961 | 7/1970 | Suda et al. | 264/313 |
| 4,419,115 | 12/1983 | Johnson, Jr. | 65/18.1 |
| 4,776,867 | 10/1988 | Onorato et al. | 423/338 |

Primary Examiner—Jay H. Woo
Assistant Examiner—Duane S. Smith
Attorney, Agent, or Firm—Henry P. Sartorio; Nora Hackett; Daryl S. Grzybicki

[57] ABSTRACT

The invention describes a method for making monolithic castings of transparent silica aerogel with densities in the range from 0.001 g/cm$^3$ to 0.6 g/cm$^3$. Various shapes of aerogels are cast in flexible polymer molds which facilitate removal and eliminate irregular surfaces. Mold dimensions are preselected to account for shrinkage of alcogel which occurs during the drying step of supercritical extraction of solvent.

8 Claims, 2 Drawing Sheets

METHOD OF CASTING AEROGELS

The United States Government has rights in this invention pursuant to Contract No. W-7405-ENG-48 between the U.S. Department of Energy and the University of California, for the operation of Lawrence Livermore National Laboratory.

This application is a continuation-in-part of the U.S. application Ser. No. 07/571,061 filed Aug. 23, 1990, now abandoned.

FIELD OF THE INVENTION

The subject invention relates generally to a method of casting preselected size aerogel shapes using flexible molds. This new method of producing aerogel castings, especially low density aerogel castings with flat, parallel sides, eliminates irregular or raised surface features.

BACKGROUND OF THE INVENTION

Conventional methods for production of condensed silica aerogels use silica gels which are synthesized in a single step hydrolysis of a silica alkoxide, such as tetramethoxysilane (TMOS) with water in the presence of basic catalysts.

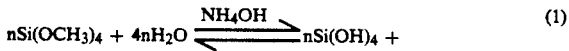

(1)

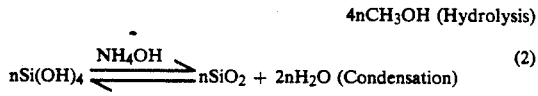

(2)

The condensation reaction step immediately follows hydrolysis to yield an alcogel, so the overall reaction rate is largely determined by the hydrolysis rate. The spheroidal macroparticles which grow from the condensed silica alcogel are surrounded by alcohol solvent which is typically removed by supercritical extraction, with high temperatures and pressures, in an autoclave.

A more recently described method for production of condensed silica is a two-step method which enables production of silica aerogels of very low density. A related U.S. application Ser. No. 07/571,061, describes this two-step method for making aerogels, especially those of very low density. In this process, a sub-stoichiometric amount of water is used in the hydrolysis reaction with an acid catalyst and solvent alcohol so that the metal alkoxide, in the preferred mode TMOS, is only partially hydrolyzed. The solvent alcohol and reaction-generated alcohol are removed by distillation, leaving a partially condensed silica intermediate. The partially condensed silica intermediate was stablized against further hydrolysis by dilution with a non-alcohol solvent. Silica aerogels having a final density as low as 0.003 g/cm$^3$ could be made from these gels by further dilution of the partially condensed silica intermediate with large quantities of non-alcoholic solvent and by use of base catalyst for the condensation step. Further modifications enabled us to successfully produce transparent silica aerogels at any density less than 0.02 g/cm$^3$, including ultra-low density aerogels which have a density in the range of about 0.003 g/cm$^3$.

Casting silica aerogel slabs with specific sizes and shapes, especially aerogels with ultra-low densities, has been problematic in the past because of 1) the tendency of the gel to adhere to the mold surface, and 2) the tendency of the gel to shrink and warp during the drying process. Additionally, irregular shapes occur in the castings due to the meniscus which forms on the free surface of the gel in the mold. Commonly used molding techniques are not satisfactory. When glass molds are used, the mold must be coated with a releasing compound to prevent sticking of the gel to the casting. The same is true for stainless steel molds. Teflon molds do not stick to the aerogel casting, but teflon molds deform at the high temperatures required for extraction of solvent from the gel. Uncoated aluminum metal molds are dissolved by the solvent.

SUMMARY OF THE INVENTION

Accordingly, it is an object of the present invention to provide a method for casting monolithic slabs of aerogels with flat or curved surfaces.

A further object is to provide a precision casting of ultra-low density aerogel with flat or curved surfaces.

Another object is an ultra-low density aerogel casting produced by a process which accommodates shrinkage and surface distortion during the casting process.

The instant invention describes a method and apparatus for the production of various shapes and sizes of aerogels. An aerogel casting of the desired size is produced by preparing a metal mandrel or casting block of a desired shape, which is larger than the desired final dimensions of the aerogel casting to accommodate for shrinkage. The mandrel is used to form a flexible rubber mold which may be easily removed from the cast alcogel. The method may be used to prepare thin panes or slabs of ultra-low density aerogel with flat and parallel surfaces which do not stick or experience distortion during the casting process. Three-dimensional or curved castings may be made of a multi-part mold. Supercritical extraction of the solvent from the alcogel produces an aerogel casting of the desired dimensions.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

DESCRIPTION OF THE INVENTION

Figure 1:
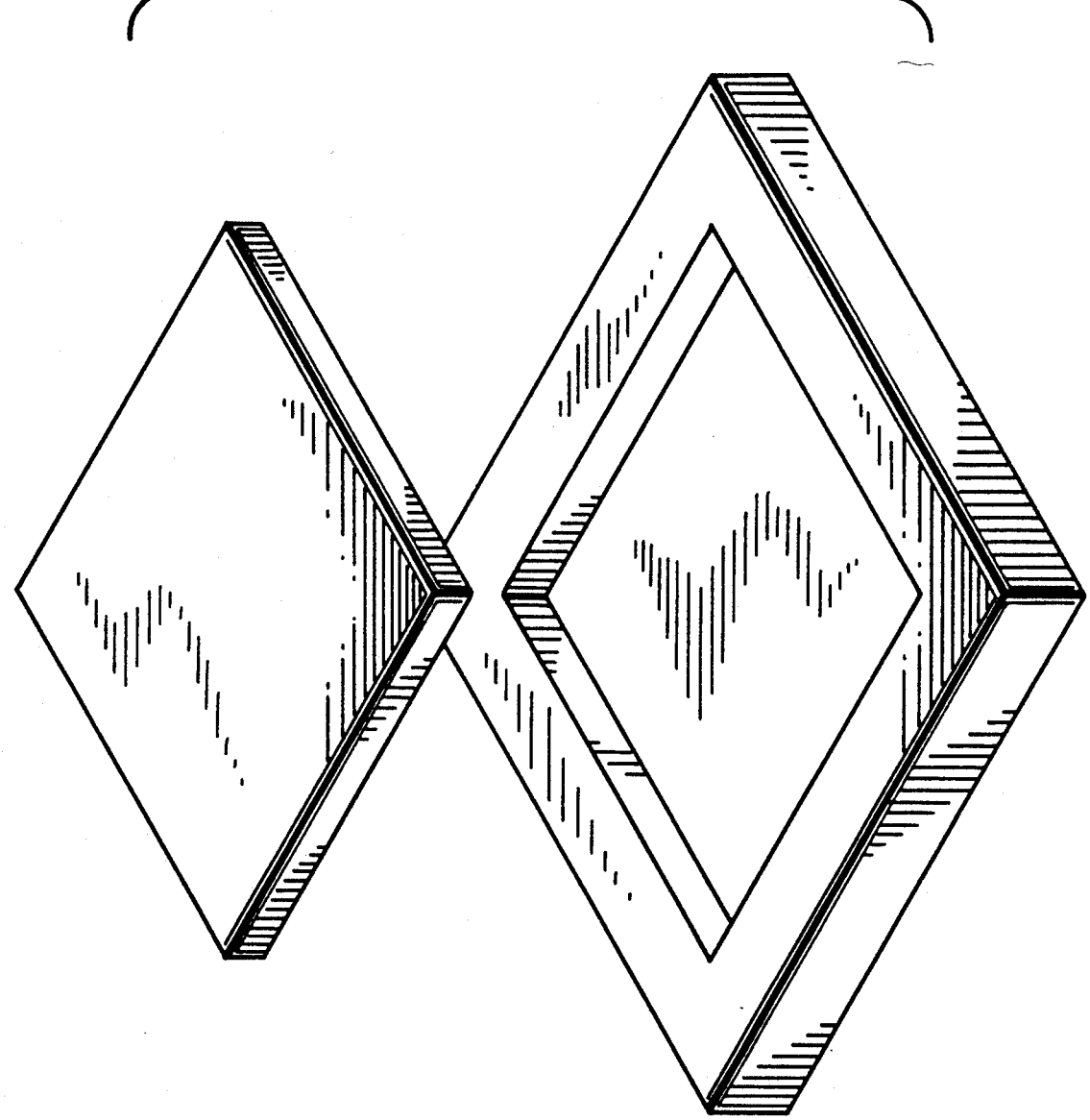
FIG. 1, silicone rubber mold and mandrel used for casting silica aerogel tiles.
Figure 2:
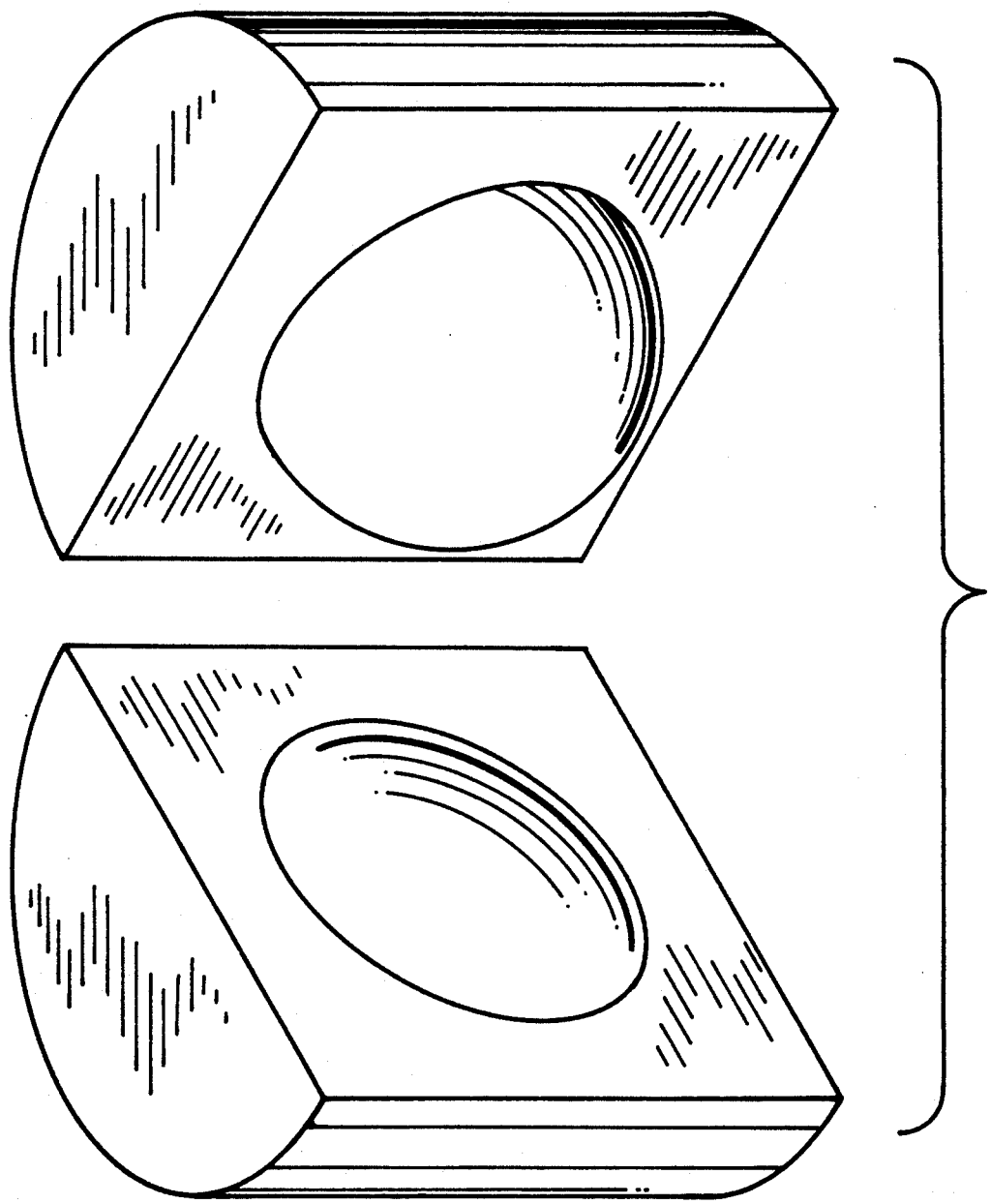
FIG. 2, two-part silicone rubber mold used to cast spherical shapes of silica aerogels.

The subject invention is directed to a method and apparatus for the production of monolithic aerogels of various sizes and shapes. Aerogels can be produced in a variety of densities which range from as much as about 0.8 g/cm$^3$ to as low as about 0.003 g/cm$^3$. Aerogels produced by a conventional one-step hydrolysis/condensation process have a lower density limit of about 0.02 g/cm$^3$. With the use of the two-step hydrolysis technique described in U.S. Ser. No. 07/571,061, aerogels can be made in a variety of densities including ultra-low densities, which range from 0.02 to about 0.003 g/cm$^3$. Aerogel castings of a specific shape and size are prepared by a multi-step procedure which avoids shrinkage and distortion.

The first step in production of an aerogel casting is to define the initial dimensions of the flexible casting mold that will be used to mold the aerogel based on the shrinkage character of the aerogel. Aerogel shrinkage appears to be linear in all dimensions. The shrinkage for a particular casting is estimated based on the density at which the aerogel is made, and is predictable only at that selected density as the amount of shrinkage varies in aerogels which range from low to high density. The mandrel, or casting block, from which the flexible casting mold is produced is selected to be of dimensions which are large enough to account for the calculated shrinkage of an aerogel of a particular density during the drying step.

Shrinkage for aerogels with a density of approximately 0.15 g/cm$^3$ was demonstrated to be less than 1-2%. Aerogels of lower and higher densities show considerably greater shrinkage, as much as 11-12% for aerogels of a density of 0.05 g/cm$^3$. The appropriate size for the mandrel was estimated from the size of the selected final aerogel casting.

The density of a final aerogel casting product was pre-selected and the proportion of reactants determined from the specifications of the reaction equation. The size of the flexible casting mold was determined by considering the final product size and the shrinkage rate for aerogel of a particular density. A mandrel was made to that calculated size and a flexible casting mold was made around it of a flexible molding polymer material, including but not limited to polyvinylpyrolidine, silicone and rubber.

The aerogel was produced in a two-step hydrolysis method which was described in related co-pending U.S. application Ser. No. 07/571,061; that enables production of transparent silica aerogels of very low density. Briefly, very pure metal or silica alkoxides are hydrolyzed with a sub-stochiometric amount of water, an acid catalyst and solvent alcohol to yield a partially hydrolyzed intermediate. Solvent alcohol and reaction-generated alcohol are removed by distillation and the partially condensed silica intermediate is stabilized against further hydrolysis by diluation with non-alcoholic solvent and base catalyst. This method enables production of aerogels with very low-densities, including those as low as about 0.003 g/cm$^3$.

The mandrel may be made from a variety of materials, including but not limited to metals and plastics which can be polished to a smooth surface. In a preferred mode, aluminum metal was selected as a mandrel material as it is readily available and easily machined to flat surfaces. A variety of plastic materials, including lexan, nylon, and teflon could also be used for the mandrel. The flexible casting mold, which is produced against this mandrel, has a surface finish that is directly equivalent to the finish of the mandrel. Scanning electron microscopy shows finished aerogel surfaces that are smooth in the sub-micron range if the mandrel used for making the mold had highly polished surfaces. Typical machined surfaces may also be suitable.

A flexible casting mold was formed by bridging a glass wall about the mandrel and filling with a flexible molding polymer material. In a preferred mode to make a flat plate, one of the large flat sides of the mandrel was coated with high temperature vacuum grease and then placed on a glass plate. The mandrel was then pressed against the glass firmly to extrude any excess grease, which was wiped away from the glass/aluminum mandrel juncture. Failure to wipe off the excess grease would result in the incorporation of that variant surface into the smooth surface of the flexible casting mold. Walls made from glass slides were built to surround the aluminum mandrel on the glass plate. The glass slide walls were positioned as a "fence" around the aluminum mandrel (about ½" distance) at a distance which would provide a pliable, but not too flexible casting mold.

The glass walls that surrounded the mandrel were positioned with a flexible plastic forming compound, such as molten wax, so that they could be easily removed. The walls were potted to the glass plate with silicone or other pliable adhesive material. It may be necessary to coat the glass wall slides with a silicone-based mold-release material prior to attaching them to the glass plate with molten wax.

When used to produce aerogel plates, the flexible casting mold is typically made with one open surface. Partially condensed silica alkoxide intermediate solution is poured into the flexible mold and the gel is removed after gelation. A three-dimensional flexible casting mold may be made in several parts. In the preferred mode the mold may be made with two halves. A bipartite mold enables the production of complex shapes in the casting.

The flexible molding polymer material used for the casting mold can be of any of several types of polymers, which are not reactive with the aerogel, including but not limited to silicone rubber, which is viscous for easy pouring, and remains flexible. It is preferred that the flexible molding polymer material cures at room temperature into a clear, flexible mold. When the molding material is prepared by mixing of two or more components, it is important that the mixture be degassed to remove any air bubbles. The degassing is performed in a simple vacuum chamber, where the degassing vacuum is applied slowly to prevent frothing in the mixing container. Vacuum degassing of the flexible molding polymer material for removal of any bubbles may require about 30 minutes.

In a preferred mode to make a flexible casting mold to cast aerogel plates or monoliths, the flexible molding polymer material is poured over the mandrel or casting block and inside the "fence" of glass slides, to a depth of ¼ to ½ inch. This wall thickness provides enough stiffness and yet flexibility so that molded alcogel castings may be released later after complete condensation. When the polymer of the flexible mold has cured, the mold may be used for casting aerogels into the desired shape.

When filling the flexible casting mold with alcogel, it is necessary to pour enough alcogel solution into the mold so that there is a convex surface. Failure to have a convex surface will cause introduction of bubbles when the glass cover is applied. The glass cover, a polished glass sheet or pane, is applied to the upper surface of the mold with a horizontal sliding motion. Direct emplacement of the glass pane on the mold from above will trap air bubbles under the glass pane. A mold release material may be used on the glass pane but, it is not always necessary for sealing of the mold and later release of the aerogel from the casting mold. The glass covers should be weighted to guarantee a proper seal. Failure to maintain a proper seal will lead to cracking of the alcogel. It is necessary to remove the glass covers promptly after the alcogel has set. Removal of the glass cover after a lengthy period of curing time will most likely damage the alcogel.

An alternative to removal of the flexible casting mold cover shortly after gelation is to place the filled casting molds into an environment of methanol vapors. A desiccator partially filled with methanol is suitable. The removal of the alcogel from the mold must be done carefully and quickly so that the alcogel is kept moist with solvent at all times. If not kept moist, the alcogel will crack. The gel should not be removed from the solvent for more than a short time, preferably no more than about 30 seconds.

To remove the alcogel from the flexible casting mold, the sides of the mold are gently flexed to break the seal between the alcogel and the flexible silicone casting mold. There is no adhesion of the alcogel to the silicone, however, the contact compares to a vacuum seal. The sides of the flexible silicone mold should be flexed on all sides, with special attention to removal of the alcogel tile at the corners. After the alcogel has been freed from the sides it may be popped loose from the inverted mold and dropped gently into a waiting petri dish, which is partially filled with solvent to prevent drying and mechanical damage, cushioning and moisture. The alcogel may be stored until an appropriate time for supercritical extraction.

The supercritical extraction process imposes stresses on the alcogel during the drying process which exposes the gel to high temperature and pressures. These temperatures range from about 250° C. to 320° C. and pressures range from 1500 to 3000 psi for times of about eight hours. For example, if the solvent evaporates from the alcogel tile into air, the alcogel tile exhibits warping of the edges. This twisting probably occurs due to shrinkage forces acting on the pliable alcogel. The supercritical extraction process also induces these shrinkage forces and the alcogel must be constrained in order to produce a flat pane of aerogel.

Warping or slumping is limited if the alcogel tiles are covered with a piece of glass (nominally ⅛ inch thick) during supercritical extraction. Covering the alcogel with a piece of glass provides sufficient weight to prevent distortion of the alcogel. The alcogel tiles are placed in a horizontal position with the glass on both bottom and top. Vertical positioning is ineffective since handling is extremely difficult, as the alcogels are slippery and fragile. Any damage at this stage renders them useless.

The attention to the details in making a precise product of appropriate dimensions is especially important for aerogels of the ultra-low density range. Aerogel tiles of density greater than 0.1 g/cm$^3$ are very easy to handle. Aerogel tiles of the lower density ranges, however, less than 0.02 g/cm$^3$, can be successfully handled using the techniques described herein, including aerogels in the lowest density produced, at about 0.003 g/cm$^3$.

EXAMPLES

1. Construction of an Appropriate Plate Mandrel

Shrinkage of the aerogel was linear at each density. Previous experiments indicated a 11–12% gel shrinkage for aerogels with a density of 0.05 g/cm$^3$. The correct size of the mandrel was calculated from the aerogel density, the shrinkage ratio at that particular density and the final size of the desired aerogel casting. The mandrel is milled with planed or polished surfaces. In the preferred mode, an aluminum mandrel is cut to the shape desired and is oversized from the expected final dimensions of the aerogel tile by an amount to account for the expected shrinkage. The surfaces of the metal mandrel block are polished to achieve the desired finish on the aerogel casting. The block is coated with vacuum grease, such as Dow Corning—High Vac Grease, and placed on a flat glass plate. The block is pressed against the glass until excess grease is forced from the glass-mandrel interface. Excess grease is wiped away. The walls, which are used to contain the silicone molding polymer, are formed from glass slides or plates bonded into a vertical perimeter position around the block with molten wax (Parowax). A minimum distance of ⅛ inch between the casting block and the positioned walls assures a stiff but flexible casting mold after curing.

2. Production of the Rubber Mold

In the preferred mode, the silicone molding polymer used is Sylgard 184, a two part mix that cures to a clear, flexible silicone. The two components of Sylgard 184 are well mixed and degassed for 30 minutes in a simple vacuum chamber to remove any air bubbles which are created by the stirring of the polymer components. The degassed Sylgard mixture 184 is then poured around the mandrel to a height above the mandrel of approximately ⅜ inch. This thickness of the mold provides stiffness and sufficient flexibility. The Sylgard 184 silicone polymer requires 12 hours at room temperature to cure, after which the flexible mold is removed from the glass and the mandrel is removed from the mold.

3. Casting of the Aerogel

Condensed silica was prepared as described in U.S. application Ser. No. 07/571,061, to have a final density in the range of 0.003 to 0.6 g/cm$^3$. The condensed silica solution is quickly poured into the silicone flexible casting molds in slight excess so that a convex surface is formed. A glass cover slide, coated with mold release (Synair Cil Release 1000), is applied to the upper surface of the mold with a sliding motion. This procedure eliminates the excess solution and forms a seal without forming bubbles. The glass slide is weighted until the condensed silica solution cures to an alcogel, in the preferred mode, about four hours.

The removal of the cast alcogel from the silicone casting mold is a critical step. The alcogel must be removed quickly (in less than 30 sec) to avoid damaging the fragile alcogel. The sides of the mold are manually flexed outwardly from the alcogel. The mold is inverted and the alcogel is released from the mold into a container of solvent. The alcogel must remain submerged in the solvent until ready for drying by supercritical extraction or it will crack due to evaporative drying.

4. Supercritical Drying of the Alcogel

In the preferred mode, the alcogels are dried by supercritical fluid extraction of the solvent at about 300° C. temperature and about 136 bars pressure, in an autoclave. To prevent warpage of flat alcogel plates, the alcogels are sandwiched between two flat glass plates during the autoclaving processess. The weight of a ⅛ inch thick glass plate is sufficient for this purpose. Several molded alcogels can be extracted simultaneously by placing them on separate shelves of a basket. The basket is lowered into an autoclave filled with solvent so that the alcogel is not exposed to air for more than a few seconds. The autoclave is sealed and pressurized before the heating cycle begins. The extraction process cycle requires approximately 24 hours, after which the dried, air-filled aerogel products are removed. Six aerogel tiles were prepared which had nominal dimensions of 1.850 ×3.550×0.2 inches, and 20 aerogel tiles were prepared which had nominal dimensions 1.850×1.850×0.2 inches. The bulk density of each aerogel tile in this group was $0.062 \pm 0.006$ g/cm$^3$. The approximate surface area per gram for each tile, as determined from measurement of a representative tile, was $559 \pm 7$ m$^2$/g. The typical hydrogen and carbon content of these aerogel tiles, as measured for a representative tile, is 1.2 wt. % and 1.4 wt. %, respectively.

The aerogel tiles prepared by the above method can be any density between 0.003 and 0.6 g/cm$^3$ and be of any shape. The size of the aerogel tiles is currently limited only by the size of the vessel used for supercritical extraction.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A method for producing a monolithic piece of low-density aerogel, having a pre-selected size, shape, and density, comprising the steps:
    (a) selecting a smooth surface mandrel of a predetermined size and shape, wherein the size of the mandrel is determined from the desired dimensions of the final aerogel piece and form a known shrinkage ratio of aerogel at the pre-selected density;
    (b) forming a flexible casting mold over the mandrel with a flexible molding polymer material, whereby the shape of the mold conforms to the shape of the mandrel;
    (c) removing the mandrel from the flexible casting mold;
    (d) casting the gel precursor solution in the flexible casting mold;
    (e) curing the solution to form an alcogel, which contains a solvent;
    (f) removing the alcogel from the flexible casting mold by flexing the mold;
    (g) supporting at least one surface of the alcogel with a sheet of rigid material that does not stick to the alcogel for preventing deformation of the alcogel; and
    (h) removing the solvent from the alcogel by supercritical extraction to form a monolithic aerogel piece.

2. A method for producing a monolithic aerogel piece as recited in claim 1, wherein the flexible molding polymer material comprises silicon rubber.

3. A method for producing a monolithic aerogel piece as recited in claim 1, wherein the flexible molding polymer material comprises polyvinyl pyrrolidine.

4. A method for producing a monolithic aerogel piece as recited in claim 1, further comprising the step:
    selecting the mandrel with the pre-determined shape having at least two parallel surfaces.

5. A method for producing a monolithic aerogel piece as recited in claim 1, further comprising the step:
    selecting the mandrel with the pre-determined shape being spherical.

6. A method as recited in claim 1, further comprising the step:
    placing the mold with the alcogel into an environment comprising methanol vapor before removing the alcogel as in step (f).

7. A method as recited in claim 1, further comprising the step:
    submerging the alcogel in a container comprising the solvent after removing the alcogel as in step (f).

8. A method for producing a monolithic piece of low-density aerogel, having a pre-selected size, shape, and density, comprising the steps:
    (a) selecting a smooth surface mandrel of a predetermined size and shape, wherein the size of the mandrel is determined from the desired dimensions of the final aerogel piece and from a known shrinkage ratio of aerogel at the pre-selected density;
    (b) forming a flexible casting mold over the mandrel with a flexible molding polymer material, whereby the shape of the mold conforms to the shape of the mandrel;
    (c) removing the mandrel from the flexible casting mold;
    (d) selecting a gel precursor solution which produces a monolithic aerogel piece having the pre-selected density in a range of about 0.001 g/cm$^3$ to about 0.02 g/cm$^3$;
    (e) casting the gel precursor solution in the flexible casting mold;
    (f) curing the solution to form an alcogel, which contains a solvent;
    (g) removing the alcogel from the flexible casting mold by flexing the mold; and
    (h) removing the solvent from the alcogel by supercritical extraction to from a monolithic aerogel piece.

* * * * *